US006993747B1

(12) United States Patent
Friedman

(10) Patent No.: US 6,993,747 B1
(45) Date of Patent: Jan. 31, 2006

(54) METHOD AND SYSTEM FOR WEB BASED SOFTWARE OBJECT TESTING

(75) Inventor: George Friedman, Framingham, MA (US)

(73) Assignee: Empirix Inc., Bedford, MA (US)

( * ) Notice: Subject to any disclaimer, the term of this patent is extended or adjusted under 35 U.S.C. 154(b) by 1208 days.

(21) Appl. No.: 09/638,828

(22) Filed: Aug. 14, 2000

Related U.S. Application Data

(60) Provisional application No. 60/151,418, filed on Aug. 30, 1999.

(51) Int. Cl.
*G06F 9/44* (2006.01)

(52) U.S. Cl. ...................................................... 717/124

(58) Field of Classification Search ................ 717/124; 714/38
See application file for complete search history.

(56) References Cited

U.S. PATENT DOCUMENTS 5,751,941 A * 5/1998 Hinds et al. .................. 714/38
6,002,869 A * 12/1999 Hinckley .................... 717/124
6,182,245 B1 * 1/2001 Akin et al. ................... 714/38
6,202,199 B1 * 3/2001 Wygodny et al. ........... 717/125
6,256,773 B1 * 7/2001 Bowman-Amuah ......... 717/121
6,286,046 B1 * 9/2001 Bryant ....................... 709/224
6,401,220 B1 * 6/2002 Grey et al. ................... 714/33
6,473,794 B1 * 10/2002 Guheen et al. ............. 709/223
6,510,402 B1 * 1/2003 Logan et al. ............... 702/186
6,523,027 B1 * 2/2003 Underwood ................... 707/4
6,574,578 B1 * 6/2003 Logan ........................ 702/122
6,601,018 B1 * 7/2003 Logan ........................ 702/186

OTHER PUBLICATIONS

Andersen, Daniel; Yang, Tao; "Multiprocessor Scheduling with Client Resources to Improve the Response Time of WWW Applications", p. 92-99, 1997 ACM, retrieved Feb. 10, 2005.*

Cook, Janice H; Groner, Leo H; "Analytic Response Time Model for Distributed Systems", p. 81-101, 1990 ACM, retrieved Feb. 10, 2005.*

Mosberger, David; Jin, Tai; "httperf-A Tool for Measuring Web Server Performance", ACM Dec. 1998, retrieved Feb. 10, 2005.*

Liu, Yew-Huey; Dantzig, Paul; Wu, C. Eric; Challenger, Jim; "A Distributed Web Server and Its Performance Analysis on Multiple Platforms", p. 665-672, 1996 IEEE, retrieved Feb. 10, 2005.*

* cited by examiner

*Primary Examiner*—Tuan Dam
*Assistant Examiner*—Mary Steelman
(74) *Attorney, Agent, or Firm*—Chapin & Huang, L.L.C.; David W. Rouille, Esq.

(57) ABSTRACT

A system for remotely testing middleware of applications in the N-tiered model across a network. The test system contains test code generators, test engines to execute multiple copies of the test code and a data analyzer to analyze and present the results to a human user. The system is able to automatically generate test code to exercise remotely located components of the middleware using information about these components that would otherwise be available to the application under test. Multiple copies of the test code are executed in a synchronized fashion. Execution times of multiple events are recorded and then presented in one of several formats. By use of the system, an application developer can receive test results about components that represent performance bottlenecks or can be made aware of information on deployment properties of individual components that can be used to enhance the performance of the application under test.

22 Claims, 4 Drawing Sheets

METHOD AND SYSTEM FOR WEB BASED SOFTWARE OBJECT TESTING

CROSS REFERENCE TO RELATED APPLICATIONS

This application claims priority from provisional U.S. application 60/151,418 filed Aug. 30, 1999, for Method and System for Software Object Testing, which is hereby incorporated by reference.

BACKGROUND OF THE INVENTION

Distributed computing has been used for many years. Distributed computing is very prevalently used in "enterprise-wide" applications. An enterprise-wide application is an application that allows a large group of people to work together on a common task. Usually, an enterprise-wide application performs functions that are essential to a company's business. For example, in a bank, people at every bank branch must be able to access a database of accounts for every bank customer. Likewise, at an insurance company, people all over the company must be able to access a database containing information about every policyholder. The software that performs these functions is generally known as enterprise-wide applications.

As available hardware and software has evolved, the architecture of enterprise wide applications has changed. An architecture which is currently popular is called the N-Tier enterprise model. The most prevalent N-tier enterprise model is a three tier model. The three tiers are the front end, the middleware and the back end. The back end is the database. The front end is sometimes referred to as a "client" or a Graphical User Interface (GUI). The middleware is the software that manages interactions with the database and captures the "business logic." Business logic tells the system how to validate, process and report on the data in a fashion that is useful for the people in the enterprise.

The middleware resides on a computer called a server. The database might be on the same computer or a different computer. The "client" is usually on an individual's personal computer. All of the computers are connected together through a network. Because many people use the enterprise wide application, such systems are set up to allow simultaneous users and there would be many clients connected to a single server. Often, many clients will be connected to the server simultaneously.

Those familiar with Internet commerce will recognize that the N-tiered model also describes many Internet web sites that sell goods or services. For example, a web site that auctions cars is likely to fit the N-tiered model. In such an application, databases are provided to track buyers, sellers and objects being auctioned. Also, a database must be provided to track the bids as they are entered. The middleware provides the access to these databases and encapsulates the business logic around such transactions as when to accept a bid, when to declare an item sold, etc. In the world of distributed computing, it makes no difference whether the "clients" using the application are employees of a single company or many Internet users throughout the world. Herein, examples of applications under test will be given, but they are not intended to imply limitations on the use of the invention. The inventions described herein could be used by developers of enterprise-wide applications or web based applications.

One advancement in the N-tiered model is that the middleware is very likely to be componentized and is very likely to be written to a component standard so that it will easily integrate with software at other tiers. Enterprise Java Bean object oriented software components by Sun Microsystems, COM, DCOM, COM+ and SOAP (Simple Object access Protocol) by Microsoft Corporation and CORBA by IBM are examples of component specification standards that are commercially available. Herein, Enterprise Java Bean object oriented software component is used as an example of a component standard used to implement middleware in an N-tiered model, but it should be appreciated that the concepts described herein could be used with other component standards.

Enterprise Java Bean object oriented software components are written in the JAVA language, which is intended to be "platform independent." Platform independent means that an application is intended to perform the same regardless of the hardware and operating system on which it is operating. Platform independence is achieved through the use of a "container." A container is software that is designed for a specific platform. It provides a standardized environment that ensures the application written in the platform independent language operates correctly. The container is usually commercially available software and the application developer will buy the container rather than create it.

Componentized software is software that is designed to allow different pieces of the application, or "objects", to be created separately but still to have the objects work together. For this to happen, the objects must have standard interfaces that can be understood and accessed by other objects. The software language enforces some parts of these interfaces. If software interfaces are not directly available as part of the system, a discovery mechanism is employed to find the interface information. If the interfaces are not used, the software objects will not be able to work with other objects. Other practices are imposed by convention. Because these programming practices are known to everyone, the companies that create the containers can rely on them when creating the container. As a result, if these practices are not followed, the container might not operate properly. Thus, there is an indirect mechanism for enforcing these practices.

Typically, applications have been tested in one of two ways. The objects are tested as they are written. Each is tested to ensure that it performs the intended function. When the objects are assembled into a completed application, the entire application is then usually tested. Heretofore, application testing has generally been done by applying test inputs at the client end and observing the response of the application. There are several shortcomings with this process. One is that it is relatively labor intensive, particularly to develop a load or scalability test. There has been no easy way to create the test program, instantiate it with test data, execute the test and aggregate the results.

Some tools, called "profilers," have been available. However, these tools track things such as disk usage, memory usage or thread usage of the application under test. They do not provide data about performance of the application based on load.

Other tools are available to automate the execution of tests on applications. For example, RSW Software, Inc. of Waltham, Mass., provides a product called e-Load. This tool simulates load on an application under test and provides information about the performance of the application. However, this tool does not provide information about the components in an application. We have recognized that a software developer would find such information very useful.

Automatic test generation tools, such as TestMaster available from Teradyne Software and System Test of Nashua, N.H., are also available. Tools of this type provide a means to reduce the manual effort of generating a test. TestMaster works from a state model of the application under test. Such an application is very useful for generating functional tests during the development of an application. Once the model of the application is specified, TestMaster can be instructed to generate a suite of tests that can be tailored for a particular task—such as to fully exercise some portion of the application that has been changed. Model based testing is particularly useful for functional testing of large applications, but is not fully automatic because it requires the creation of a state model of the application being tested.

We have recognized that a second shortcoming of testing enterprise wide applications is the critical performance criteria to measure often relates to how the application behaves as the number of simultaneous users increases. There are examples of websites crashing or operating so slow as to frustrate an ordinary user when too many users log on simultaneously. In the past, load has been simulated informally, such as by having several people try to use the application at the same time. Some tools exist to provide a load on an application for testing, such as e-Load available from RSW of Waltham, Mass.

However, it has generally not been until the application is deployed into its intended operating environment that the performance of the application under load is known. Thus, the biggest problem facing an application developer might not be testing to see whether each object performs as designed or even whether the objects work together as a system. Heretofore there has been no available tool that will help an application developer ascertain how many simultaneous users a middleware application can accommodate given a specified transaction response time or identify which object in the application, given real world load conditions, is causing the bottleneck. Response time is one major load test measure. Another is throughput. Response time measures the time it takes for an individual transaction to complete. Throughput is a measure of how many transactions are being processed per time unit, and measures the amount of work the system is doing. Additionally, developers who wish to have their component tested or qualified may wish to do so without creating their own tests, and further without providing their software components to others.

SUMMARY OF THE INVENTION

With the foregoing background in mind, it is an object of the present invention to provide a web based test harness in order to facilitate remote testing and/or verification of software components located on a remote system. The software component can be load tested remotely. The tests used to test and validate the remote software component may be automatically generated from/for the remote software components. The testing may be performed on a single software component, a plurality of software components and on an application including one or more software components. In a presently preferred embodiments, the test system analyzes response time measurements from plural software objects within the application and predicts which software object within the application that is likely to be a performance bottleneck.

BRIEF DESCRIPTION OF THE DRAWINGS

The invention will be better understood by reference to the following more detailed description and accompanying drawings in which.

DETAILED DESCRIPTION

Figure 1:
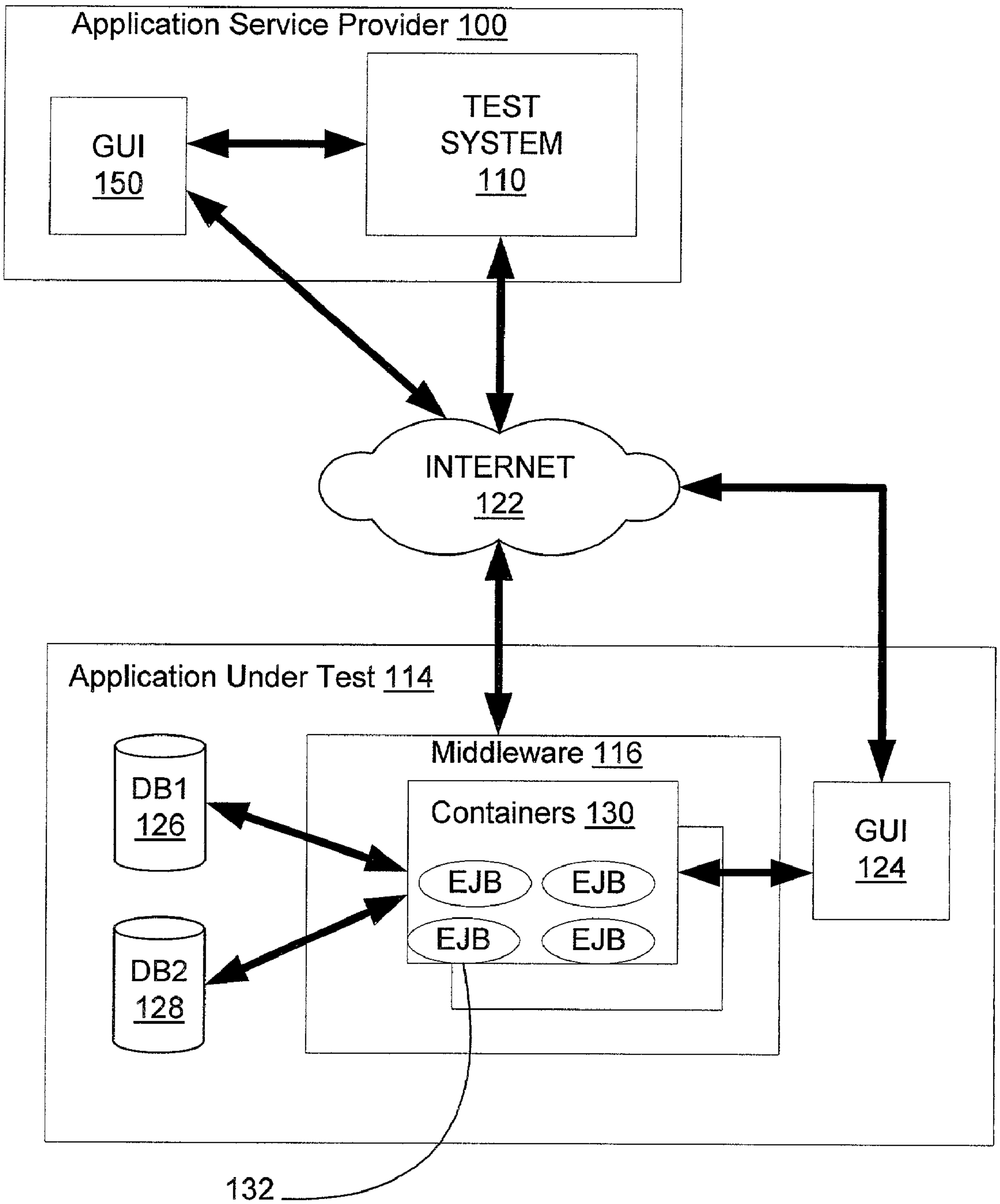
FIG. 1 is an illustration of a remote application under test by the test system of the invention.

FIG. 1 illustrates a test system 110 according to the present invention. The system is remotely testing application under test 114. Here application under test 114 is an application in the N-tiered model. More specifically, it is a three tiered database application. Application under test 114 could represent a database for a bank or an insurance company or it could represent an Internet application. The specific function of application under test 114 is not important to the invention.

Also, the specific hardware on which test system 110 and the application under test 114 reside is not important to the invention. It is sufficient if there is some connection between the two which are located remote from each other. In the illustration, that connection is provided by the Internet 122. In this scenario, test system 110 could be located in a server owned by a testing company or Application Service Provider (ASP) 100. Many applications are written using platform independent technology such that the application will perform the same on many different platforms. Platform independent technology is intended to make it easy to run an application on any platform.

Application under test 114 is a software application as known in the art. It includes middleware 116 that encapsulates some business logic. A user accesses the application through a client device. Many types of client devices are possible, with the list growing as networks become more prevalent. Personal computers, telephone systems and even household appliances with micro-controllers could be the client device. In use, it is contemplated that there would be multiple users connected to application under test 114. The number of users simultaneously accessing application under test 114 is one indication of the "load" on the application.

Access to the application under test is, in the illustrated embodiment, through Graphical User Interface (GUI) 124 of the type known in the art. Software to manage interactions between multiple users and an application is known. Such software is sometimes called a web server. Web servers operate in conjunction with a browser, which is software commonly found on most PC's.

The web server and browser exchange information in a standard format known as HTML. An HTML file contains tags, with specific information associated with each tag. The tag signals to the browser a type associated with the information, which allows the browser to display the information in an appropriate format. For example, the tag might signal whether the information is a title for the page or whether the information is a link to another web page. The browser creates a screen display in a particular window based on one or more HTML pages sent by the web server.

When a user inputs commands or data into the window of the browser, the browser uses the information on the HTML page to format this information and send it to the web server. In this way, the web server knows how to process the commands and data that comes from the user.

GUI 124 passes the information and commands it receives on to middleware 116. In the example of FIG. 1, middleware

116 is depicted as a middleware application created with Enterprise Java Bean object oriented software components. Containers 130 are, in a preferred embodiment, commercially available containers. Within a container are numerous enterprise Java beans 132. Each Java bean 132 can more generally be thought of as a software component. GUI 124 passes the information to the appropriate Enterprise Java Bean object oriented software component 132. Outputs from application under test 114 are provided back through GUI 124 for display to a user.

Enterprise Java Bean object oriented software components 132, in the illustrated example, collectively implement a database application. Enterprise Java Bean object oriented software components 132 manage interactions with and process data from databases 126 and 128. They will perform such database functions as setting values in a particular record or getting values from a particular record. Other functions are creating rows in the database and finding rows in the database. Enterprise Java Bean object oriented software components that access the database are often referred to as "entity beans."

Other types of Enterprise Java Bean object oriented software components perform computation or control functions. These are called "session beans." Session beans perform such functions as validating data entries or reporting to a user that an entry is erroneous. Session beans generally call entity beans to perform database access.

It will be appreciated that, while it is generally preferable to segregate programming of the application in such a way that each type of database transaction is controlled by a single bean that performs only that function, some entity beans will perform functions not strictly tied to database access. Likewise, some session beans will perform database access functions without calling an entity bean. Thus, while different testing techniques will be described herein for testing session beans and entity beans, it is possible that some Enterprise Java Bean object oriented software components will have attributes of both entity and session beans. Consequently, a full test of any bean might employ techniques of testing entity beans and testing session beans.

Test system 110 is able to access the Enterprise Java Bean object oriented software components 132 of application under test 114 over Internet 122. In this way, each bean can be remotely exercised for testing at the developer's site. Thus, the developer merely allows ASP 100 to access the software component across the Internet and perform the testing. In the preferred embodiment, the tests are predominately directed at determining the response time of the beans—or more generally determining the response time of components or objects used to create the application under test. Knowing the response time of a bean can allow conclusions about the performance of an application. As described above, response time is one major load test measure. Another is throughput. Response time measures the time it takes for an individual transaction to complete. Throughput is a measure of how many transactions are being processed per time unit, and measures the amount of work the system is doing. The details of test system 110 are described below.

In the illustrated embodiment, test system 110 is software installed on one or more servers at the ASP location. In a preferred embodiment, test system 110 is a JAVA application. Like application under test 114, test system 110 is controlled through a graphical user interface 150. GUI 150 might be a web server as known in the art.

Figure 2:
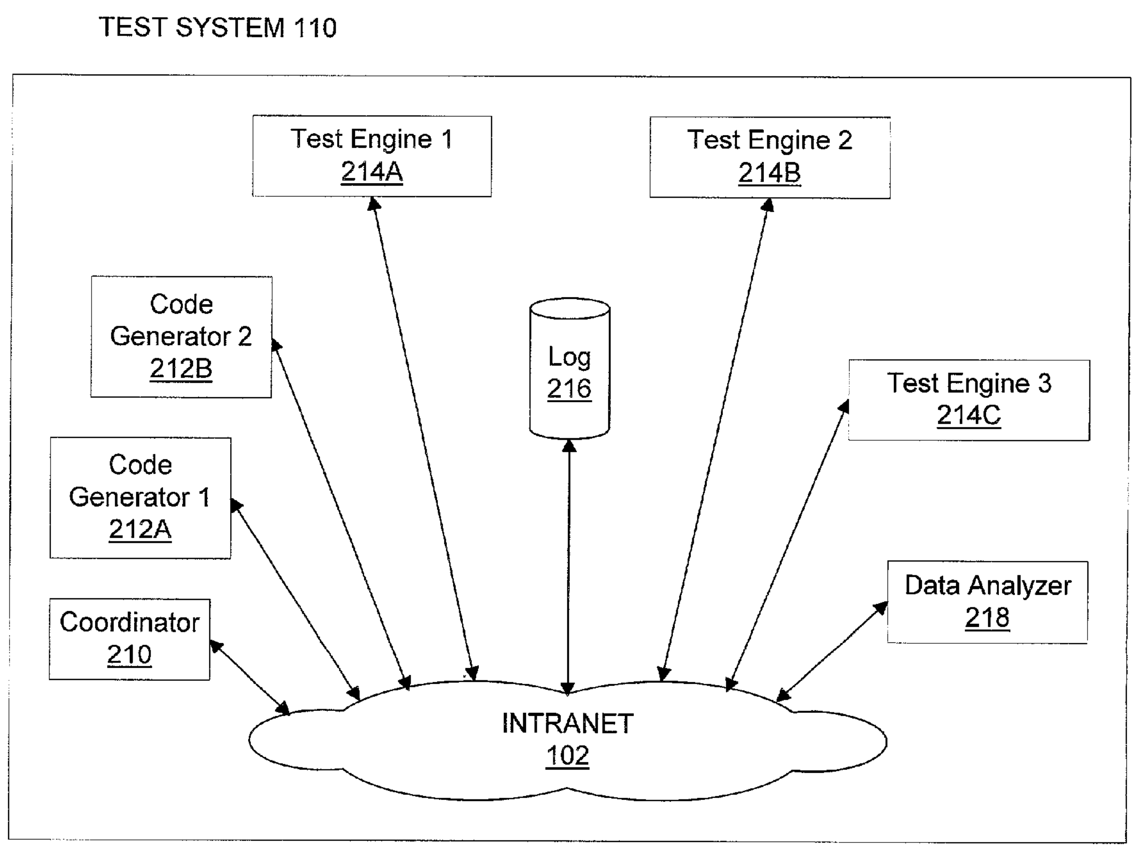
FIG. 2 is an illustration showing the test system of the invention in greater detail.

Turning now to FIG. 2, details of test system 110 are shown. Test system 110 performs several functions. One function is the generation of test code. A second function is to execute the test code to remotely exercise one or more Enterprise Java Bean object oriented software components in the application under test. Another function is to record and analyze the results of executing the test code. These functions are performed by software running on one or more computers connected to internal network (Intranet) 102. The software is written using a commercially available language to perform the functions described herein.

FIG. 2 shows that test system 110 has a distributed architecture. Software components are installed on several different computers within the test system. Multiple computers are used both to provide capability for multiple users, to perform multiple tasks and also to run very large tests. The specific number of computers and the distribution of software components of the test system on those computers is not important to the invention.

Figure 3:
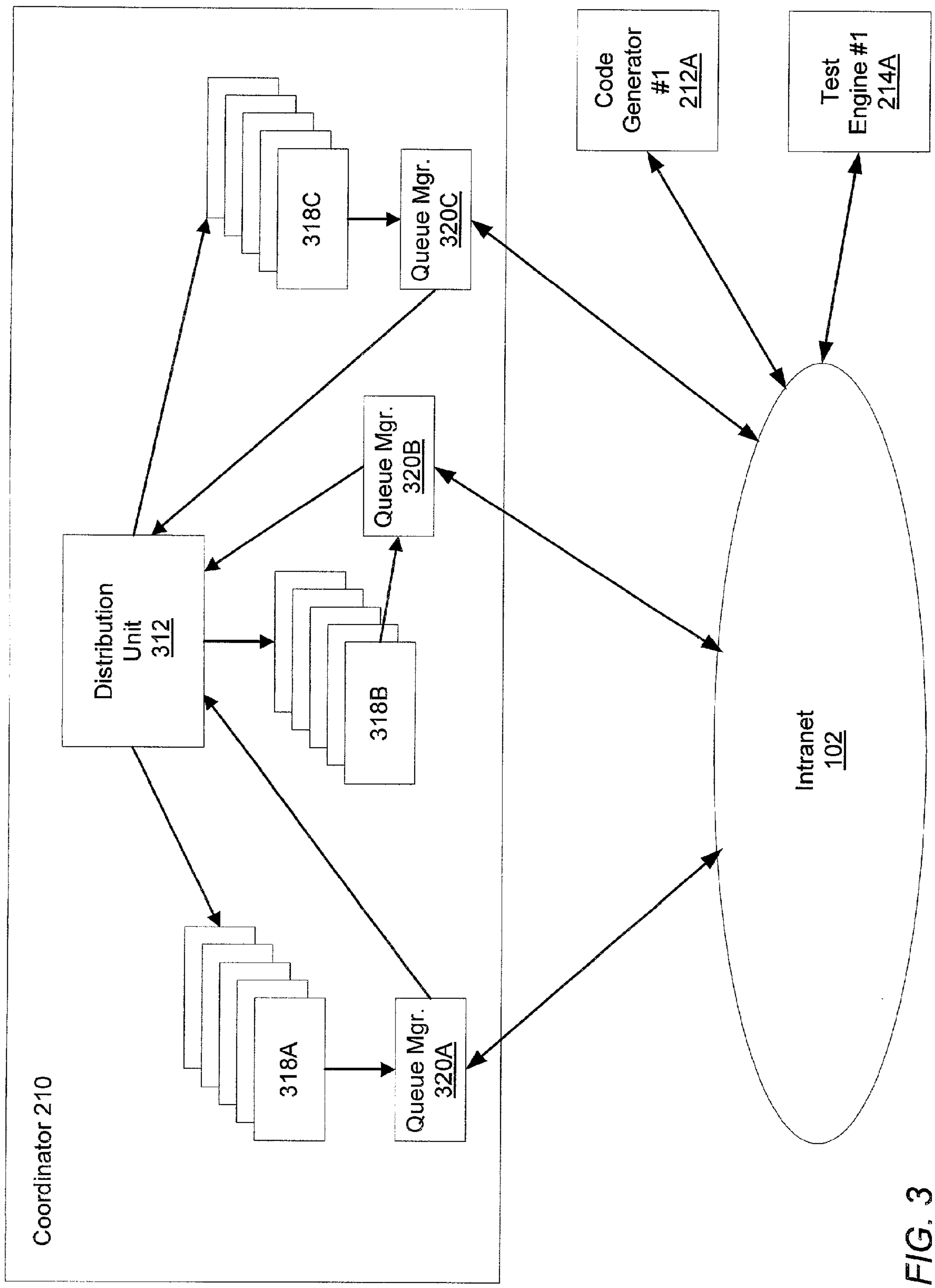
FIG. 3 is an illustration showing the coordinator of FIG. 2 in greater detail.

Coordinator 210 is a software application that interfaces with GUI 150. The main purpose of coordinator 210 is to route user requests to an appropriate server in a fashion that is transparent to a user. Turning to FIG. 3, coordinator 210 is shown in greater detail. It should be appreciated, though, that FIG. 3 shows the conceptual structure of coordinator 210. Coordinator 210 might not be a single, separately identified piece of software. It might, for example, be implemented as coordination software within the various other components of test system 110. Also, it should be realized that a web server used to implement GUI 150 also provides coordination functions, such as queuing multiple requests from an individual or coordinating multiple users.

Coordinator 210 contains distribution unit 312. Distribution unit 312 is preferably a software program running on a server. User requests are received by distribution unit 312. As the requests are received, distribution unit 312 determines the type of resource needed to process the request. For example, a request to generate code must be sent to a server that is running a code generator.

Coordinator 210 includes several queues to hold the pending requests. Each queue is implemented in the memory of the server implementing coordinator 210. In FIG. 3, queues 318A . . . 318C are illustrated. Each queue 318A . . . 318C corresponds to a particular type of resource. For example, queue 318A could contain code generator requests, queue 318B could contain test engine requests and queue 318C could contain data analysis requests. Distribution unit sends each request to one of the queues 318A . . . 318C, based on the type of resources needed to process the request.

Associated with each queue 318A . . . 318C is queue manager 320A . . . 320C. Each queue manager is preferably implemented as software running on the server implementing coordinator 210 or the server implementing the relevant piece of coordinator 210. Each queue manager maintains a list of servers within test system 110 that can respond to the requests in its associated queue. A queue manager sends the request at the top of the queue to a server that is equipped to handle the request. The connection between the queue manager and the servers equipped to handle the requests is over Intranet 102. If there are other servers available and still more requests in the queue, the queue manager will send the next request in the queue to an available server. When there are no available servers, each queue manager waits for one of the servers to complete the processing of its assigned request.

As the requests are processed, the servers, such as the code generators and the test engines report back to the queue managers. In response, the queue managers send another request from the queue and also provide the results back to the distribution unit 312. Distribution unit 312 can then reply back to the user that issued the request, indicating that the request was completed and either giving the results or giving the location of the results. For example, after test code is generated, the user might receive an indication of where the test code is stored. After a test is executed, the user might receive a report of the average execution time for the test or the location of a file storing each measurement made during the test.

It will be appreciated by one of skill in the art that software systems that process user commands, including commands from multiple users, are well known. Such systems must have an interface for receiving commands from a user, processing those commands and presenting results to the user. Such interfaces also allow those results to be used by the user for implementing further commands. Such an interface is employed here as well and is depicted generally as GUI 150. For example, GUI 150 will allow a user to enter a command that indicates code should be generated to test a particular application. Once the code is generated, GUI 150 allows the user to specify that a test should be run using that test code.

It is possible that some requests will require the coordination of multiple hardware elements. As will be described hereafter, one of the functions of the test engines is to apply a load that simulates multiple users. In some instances, one computer can simulate multiple users by running multiple client threads. However, there is a limit to the number of client threads that can run on a server.

Figure 4:
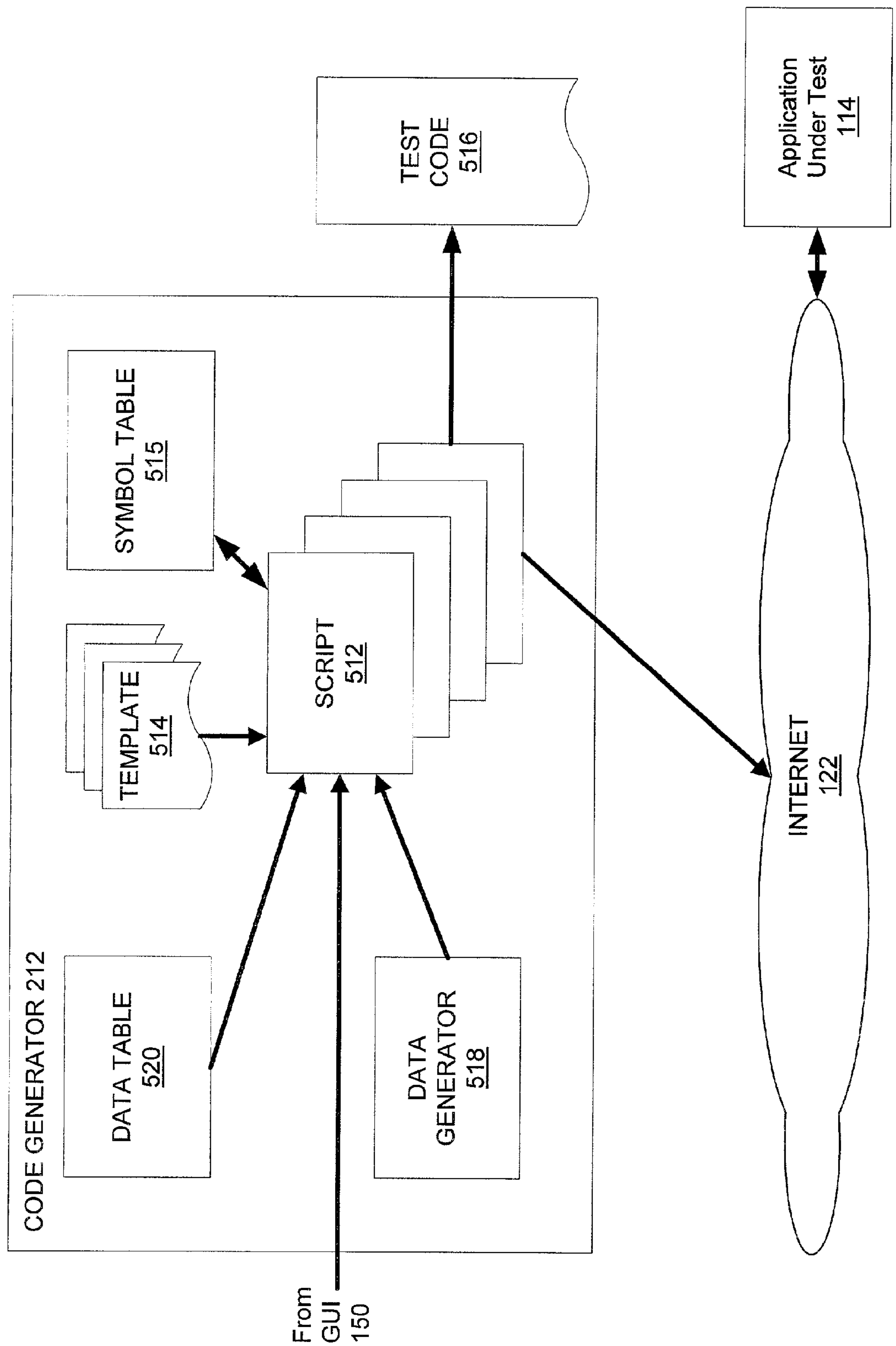
FIG. 4 is an illustration showing the code generator of FIG. 2 in greater detail.

For test system 110 to operate, it is necessary that there be test code. A user could provide test code. Or, test code could be provided by automatic code generation systems, such as TESTMASTER sold by Teradyne Software and System Test of Nashua, N.H. However, FIG. 2 illustrates that code generators 212A and 212B are used in the preferred embodiment to create the code. Turning to FIG. 4, greater details of a code generator 212 are shown.

Code generator 212 contains several scripts 512. Each script is a sequence of steps that code generator 212 must perform to create code that performs a certain type of test. The scripts can be prepared in any convenient programming language. For each type of test that test system 110 will perform, a script is provided. User input on the type of test that is desired specifies which script 512 is to be used for generating code at any given time.

The selected script 512 assembles test code 516. The information needed to assemble test code 516 comes from several sources. One source of information is the test templates 514. There are some steps that are needed in almost any kind of test. For example, the object being tested must be deployed and some initialization sequence is required. If the tests are timed, there must be code that starts the test at a specified start time and an ending time of the test must be recorded. Also, there must be code that causes the required data to be logged during the test. After the test, there might also be some termination steps that are required. For example, where the initialization started with a request for a reference to a particular Enterprise Java Bean object oriented software component, the test code will likely terminate with that reference being released. The test code to cause these steps to be performed is captured in the set of templates 514.

In addition, there might be different templates to ensure that the test code 516 appropriately reflects inputs provided by the user. For example, different containers might require different command formats to achieve the same result. One way these different formats can be reflected in the test code 516 is by having different templates for each container. Alternatively, a user might be able to specify the type of information that is to be recorded during a test. In that instance, a data logging preference might be implemented by having a set of templates that differ in the command lines that cause data to be recorded during a test. An example template is shown in Appendix 2.

The templates are written so that certain spaces can be filled in to customize the code for the specific object to be tested. In the preferred embodiment, code generator 212 generates code to test a specific Enterprise Java Bean object oriented software component in an application under test. One piece of information that will need to be filled in for many templates is a description of the Enterprise Java Bean object oriented software component being tested. Another piece of information that might be included is user code to put the application under test in the appropriate state for a test. For example, in testing a component of an application that manages a database of account information for a bank, it might be necessary to have a specific account created in the database to use for test purposes or it might otherwise be necessary to initialize an application before testing it. The code needed to cause these events might be unique to the application and will therefore be best inserted into the test code by the tester testing the application. In the illustrated embodiment, this code is inserted into the template and is then carried through to the final test code.

The template might also contain spaces for a human tester to fill in other information, such as specific data sets to use for a test. However, in the presently preferred embodiment, data sets are provided by the human user in the form of a data table.

Code generator 212 could generate functional tests. Functional tests are those tests that are directed at determining whether the bean correctly performs its required functions. In a functional test, the software under test is exercised with many test cases to ensure that it operates correctly in every state. Data tables indicating expected outputs for various inputs are used to create functional test software. However, in the presently preferred embodiment, code generator 212 primarily generates test code that performs load tests. In a load test, it is not necessary to stimulate the software under test to exercise every possible function and combination of functions the software is intended to perform. Rather, it is usually sufficient to provide one test condition. The objective of the load test is to measure how operation of the software degrades as the number of simultaneous users of the application increases.

In the preferred embodiment, test system 110 contains scripts 512 to implement various types of load tests. One type of load test determines response time of an Enterprise Java Bean object oriented software component. This allows the test system to vary the load on the Enterprise Java Bean object oriented software component and determine degradation of response time in response to increased load. Another type of load test is a regression type load test. In a regression type test, the script runs operations to determine whether the Enterprise Java Bean object oriented software component responds the same way as it did to some baseline stimulus. In general, the response to the baseline stimulus represents the correct operation of the Enterprise Java Bean object oriented software component. Having a regression type test allows the test system 110 to increase the load on a bean and determine the error rate as a function of load.

To generate test code 516 for these types of load tests, the script 512 must create test code that is specific to the bean under test. The user provides information on which bean to test through GUI 150. In the preferred embodiment, this information is provided by the human tester providing the name of the file within the application under test that contains the "deployment descriptor" for the specific bean under test. This information specifies where in the network to find the bean under test. Script 512 uses this information to ascertain what test code must be generated to test the bean.

Script 512 can generate code by using the attributes of the platform independent language in which the bean is written. For the example of Sun JAVA language being used here, each bean has an application program interface called a "reflection." More particularly, each bean has a "home" interface and a "remote" interface. The "home" interface reveals information about the methods for creating or finding a remote interface in the bean. The remote interface reveals how this code can be accessed from client software. Of particular interest in the preferred embodiment, the home and remote interfaces provide the information needed to create a test program to access the bean.

Using the reflection, any program can determine what are known as the "properties" and "methods" of a bean. The properties of a bean describe the data types and attributes for a variable used in the bean. Every variable used in the bean must have a property associated with it. In this way, script 512 can automatically determine what methods need to be exercised to test a bean and the variables that need to be generated in order to provide stimulus to the methods. The variables that will be by the methods as they are tested can also be determined. In the preferred embodiment, this information is stored in symbol table 515.

Symbol table 515 is a file in any convenient file format. Once the information on the methods and properties are captured in a table, script 515 can use this information to create test code that exercises the methods and properties of the particular component under test. In particular, script 515 can automatically create a variable of the correct data type and assign it a value consistent with that type for any variable used in the bean.

Data generator 518 uses the information derived from the reflection interface to generate values for variables used during testing of a bean. There are many ways that appropriate values could be generated for each variable used in the test of a particular bean. However, in the commercial embodiment of the present invention, the user is given a choice of three different algorithms that data generator 518 will use to generate data values. The user can specify "maximum," "minimum" or "random." If the maximum choice is specified, data generator 518 analyzes the property description obtained through the reflection interface and determines the maximum permissible value. If the user specifies "minimum" then data generator 518 generates the smallest value possible. If the user specifies random, data generator 518 selects a value at random between the maximum and the minimum.

In many instances where a load test is desired, the exact value of a particular variable is not important. For example, when testing whether a bean can properly store and retrieve a value from a database, it usually does not matter what value is stored and retrieved. It only matters that the value that is read from the database is the same one that was stored. Or, when timing the operation of a particular bean, it will often not matter what values are input to the method. In these scenarios, data generator 518 can automatically generate the values for variables used in the test code.

In cases where the specific values of the variables used in a test are important, code generator 212 provides the user with another option. Rather than derive values of variables from data generator 518, script 512 can be instructed to derive data values from a user provided data table 520. A user might, for example, want to provide a data table even for a load test when the execution time of a particular function would depend on the value of the input data.

A data table is implemented simply as a file on one of the computers on network 122. The entries in the table, specifying values for particular variables to use as inputs and outputs to particular methods, are separated by delimiters in the file. A standard format for such a table is "comma separated values" or CSV. In a preferred embodiment, test system 110 includes a file editor—of the type using conventional technology—for creating and editing such a file. In addition, test system 110 would likely include the ability to import a file—again using known techniques—that has the required format.

The methods of a bean describe the functions that bean can perform. Part of the description of the method is the properties of the variables that are inputs or outputs to the method. A second part of the description of each method—which can also be determined through the reflection interface—is the command needed to invoke this method. Because script 512 can determine the code needed to invoke any method and, as described above, can generate data values suitable to provide as inputs to that method, script 512 can generate code to call any method in the bean. A recording technique may be used to populate user data tables.

In the preferred embodiment, directed at load testing, the order in which the methods of a bean are called is not critical to an effective test. Thus, script 512 can automatically generate useful test code by invoking each method of the bean. There are currently three methods for ordering reflected scripts, namely, recording; code filtering; and using UML metadata.

More sophisticated tests can be automatically built by relying on the prescribed pattern for the language. In Sun JAVA, entity beans for controlling access to a database should have methods that have a prefix "set" or "get". These prefixes signal that the method is either to write data into a database or to read data from the database. The suffix of the method name indicates which value is to be written or read in the database. For example, a method named setSSN should perform the function of writing into a database a value for a parameter identified as SSN. A method named getSSN should read the value from the parameter named SSN.

By taking advantage of these prescribed patterns, script 512 can generate code to exercise and verify operation of both methods. A piece of test code generated to test these methods would first exercise the method setSSN by providing it an argument created by data generator 518. Then, the method getSSN might be exercised. If the get method returns the same value as the argument that was supplied to the set method, then it can be ascertained that the database access executed as expected.

For many types of enterprise wide applications, the beans most likely to be sensitive to load are those that access the database. Thus, testing only set and get methods provides very useful load test information.

However, the amount of testing done can be expanded where required. Some beans also contain methods that create or find rows in a database. By convention, methods that create or find rows in a database are named starting with "create" or "find." Thus, by reflecting the interface of the bean, script 512 can also determine how to test these methods. These methods can be exercised similarly to the set and get methods. The properties revealed through the application interface will described the format of each row in the database. Thus, when a create method is used, data can be automatically generated to fill that row, thereby fully exercising the create method.

In a preferred embodiment, find methods are exercised using data from a user supplied data table 520. Often, databases have test rows inserted in them specifically for testing. Such a test row would likely be written into data table 520. However, it would also be possible to create a row, fill it with data and then exercise a find method to locate that row.

Once the commands that exercise the methods of an Enterprise Java Bean object oriented software component are created, script 512 can also insert into the client test code 516 the commands that are necessary to record the outputs of the test. If a test is checking for numbers of errors, then test code 516 needs to contain instructions that record errors in log 216. Likewise, if a test is measuring response time, the test code 516 must contain instructions that write into log 216 the information from which response time can be determined. In the described embodiment, all major database functions can be exercised with no user supplied test code. In some instances, it might be possible to exercise all the functions with all test data automatically generated. All the required information could be generated from just the object code of the application under test. An important feature of the preferred embodiment is that it is "minimally invasive"—meaning that very little is required of the user in order to conduct a test and the test does not impact the customer's environment. There is no invasive test harness. The client code runs exactly like the code a user would write.

There are several possible ways that "response time" of the remote software component could be measured. As stated above response time is one major load test measure. Another is throughput. Response time measures the time it takes for an individual transaction to complete. Throughput is a measure of how many transactions are being processed per time unit, and measures the amount of work the system is doing. One way is that the total time to execute all the methods in a bean could be measured. Another way is that the start up time of a bean could be measured. The startup time is the time it takes from when the bean is first accessed until the first method is able to execute. Another way to measure response time is to measure the time it takes for each method to execute. As another variation, response time could be measured based on how long it takes just the "get-" methods to execute or just the "set-" methods to execute.

Different measurements must be recorded, depending on which measure of response time is used. For example, if only the total response time is required, it is sufficient if the test code simply records the time that the portion of the test code that exercises all the methods starts and stops executing. If the startup response time is required, then the client test code must record the time that it first accesses the bean under test and the time when the first method in the test sequence is ready to be called. On the other hand, if the response time is going to be computed for each method, the client test code must record the time before and after it calls each method and some indication of the method being called must also be logged. Similar information must be recorded if responses of just "get-" or "set-" functions are to be measured, though the information needs to be recorded for only a subset of the methods in these cases.

In addition, when there are multiple users being simulated, there are multiple values for each data point. For example, if test system 110 is simulating 100 remote users, the time that it takes for the bean to respond to each simulated remote user could be different, leading to up to 100 different measurements of response time. The response time for 100 users could be presented as the maximum response time, i.e. the time it takes for all 100 simulated users to finish exercising the bean under test. Alternative, the average time to complete could be reported as the response time. As another variation, the range of values could be reported.

In the preferred embodiment, the client test code 516 contains the instructions that record all of the information that would be needed for any possible measure of response time and every possible display format. The time is recorded before and after the execution of every method. Also, an indication that allows the method to be identified is recorded. To support analysis based on factors other than delay, the actual and expected results of the execution of each method are recorded so that errors can be detected. Also, the occurrences of exceptions are also recorded in the log. Then, a data analyzer can review the log and display the response time according to any format and using any definition of response time desired. Or the data analyzer can count the number of exceptions or errors.

Once the data is stored, the user can specify the desired format in which the data is to be presented. In a preferred embodiment, test system 110 has the ability to present the results of tests graphically to aid the tester in understanding the operations—particularly performance bottleneck—of application under test 114.

One important output is a response time versus load graph. The log file contains the starting and stopping times of execution tests for a particular test case. The test case includes the same measurements at several different load conditions (i.e. with the test engines 214A . . . 214C simulating different numbers of simultaneous users). Thus, data analyzer can read through the data in log and identify results obtained at different load conditions. This data can be graphed.

Another useful analysis is the number of errors per second that are generated as a function of the number of simultaneous users. To perform this analysis, test code 516 could contain instructions that write an error message into the log whenever a test statement produces an incorrect result. In the database context, incorrect results could be identified when the "get" function does not return the same value as was passed as an argument to the "set" function. Or, errors might be identified when a bean, when accessed, does not respond or responds with an exception condition. As above, data analyzer 218 can pass through the log file, reading the numbers of errors at different simulated load conditions. If desired, the errors can be expressed as an error count, or as an error rate by dividing the error count by the time it took for the test to run.

Some examples of the types of outputs that might be provided are graphs showing: transactions per second versus number of users; response time versus number of users; exceptions versus numbers of users; errors versus numbers of users; response time by method; response time versus run time and transactions per second versus run time. Different ways to measure response time were discussed above. In the preferred embodiment, a transaction is defined as the execution of one method, though other definitions are possible.

Run time is defined as the total elapsed time in running the test case, and would include the time to set up the execution of Enterprise Java Bean object oriented software components. Viewing response time as a function of elapsed time is useful, for example, in revealing problems such as "memory leaks". A memory leak refers to a condition in which portions of the memory on the server running the application under test gets used for unproductive things. As more memory is used unproductively, there is less memory available for running the application under test and execution slows over time. Alternatively, viewing results in this format might reveal that the application under test is effectively utilizing caching. If caching is used effectively, the execution time might decrease as elapsed time increases.

Having described the structure of test system 110 and giving examples of its application, several important features of the test system 110 can be seen. One feature is that information about the performance of an application under test can be easily obtained, with much of the data being derived in an automated fashion. A software developer could use the test system to find particular beans that are likely to be performance bottlenecks in an application. The developer could then rewrite these beans or change their deployment descriptors. For example, one aspect of the deployment descriptor indicates the number of copies of the bean that are to be instantiated within application under test 114. The developer could increase the number of instantiations of a bean if that bean is the bottleneck.

The test system described herein provides an easy and accurate tool to remotely test Enterprise Java Bean object oriented software components for scalability. It creates a user specified number of virtual users that call the Enterprise Java Bean object oriented software component while it is deployed on the applications server. The tool does this by inspecting the Enterprise Java Bean object oriented software component under test and automatically generating a client test program, using either rules based data or supplied data, and then multithreading the client test program to drive the Enterprise Java Bean object oriented software component under test. The result is a series of graphs reporting on the performance versus the number of users, which provide useful information in an easy to use format.

Another feature of the invention is that the tests are run without requiring changes in the application under test or even the installation of special test agents on the server containing the software under test. The generated test code 516 exercises the bean in the application under test using remote procedure calls.

Another feature of the described embodiment of test system 110 is that it is scalable. To increase the number of tests that could simultaneously be run or the size of the tests that could be run, more test engines could be added. Likewise, more code generators could be added to support the simulation of a larger number of simultaneous users. The specific number of copies of each component is not important to the invention. The actual number of each component in any given embodiment is likely to vary from installation to installation. The more users an application is intended to support, the more test engines are likely to be required.

Another feature of the described embodiment is that testing is done on the simplest construct in the application under test—the beans in the illustrated example. There are two benefits to this approach. First, it allows tests to be generated very simply, with minimal human intervention. Second, it allows a software developer to focus in on the point of the software that needs to be changed or adjusted in order to improve performance.

It should be appreciated that various other analyses might be performed. It has been recognized that, as the load increases, there is often some point at which the performance of the system drastically changes. In some instances, the time to complete a transaction drastically increases. A drastic increase in transaction processing time indicates that the system was not able to effectively handle the load. However, a decrease in processing time can also indicate the load limit was reached. Sometimes, a system under test will respond with an error message more quickly than it would take to generate a correct response. Thus, if the only parameter being tracked is response time, a decrease in processing time as a function of load can also signal that the maximum load has been exceeded. Of course, an increase in errors or error rate can also signal that the maximum load was exceeded. Further, by running multiple test cases, each test case focusing on a different bean, test system 110 could automatically determine the bean that is the performance bottleneck and could also assign a load rating to application under test 114.

Having described one embodiment, numerous alternative embodiments or variations might be made. For example, it was described that test system 110 automatically generates test code to exercise beans that follow a pattern for database access. These beans are sometimes called "entity beans." In general, there will be other beans in an application that perform computations on the data or that control the timing of the execution of the entity beans. These beans are sometimes called "session beans." Session beans are less likely to follow prescribed programming patterns that make the generation of test code for entity beans simple. As a result, the automatically generated test code for session beans might not fully test those beans. In the described embodiment, it is expected that the human tester supply test code to test session beans where the automatically generated tests are inadequate.

One possible modification to the described embodiment is that the completeness of tests for session beans might be increased. One way to increase the accuracy of tests for session beans would be to capture data about the execution of those beans during actual operation of the application under test 114. This data could allow an automated system to determine things like appropriate data values, which might then be used to build a data table. Or, the captured data could allow the automated system to determine the order in which a session bean accesses other session beans or entity beans to create a realistic test.

Also, as described, test code is generated to test a particular bean, which is a simple construct or "component" of the application under test. The testing could focus on different constructs, such as specific methods in a bean. Test code could be generated to test specific methods within beans. Or, it was described that the system records start and stop time of the execution of the test code. The times of other events could be recorded instead or in addition. For example, start and stop times of individual methods might be recorded, allowing performance of individual methods to be determined.

Alternatively, the complexity of the constructs being tested could be increased. Multiple beans might be tested simultaneously to determine interactions between beans. For example, multiple test cases might be executed at the same time, with one test case exercising a specified instances of one bean and a different test case exercising a specified number of instances of a second bean.

As another example of possible variations, the number of templates used to construct test code might be varied. One possibility is that each template contains all of the steps needed to initialize, run and terminate a test. Thus, test code would be created by filling in a single template. Alternatively, each template might contain only the steps needed to perform one function, such as initialization, testing or termination. In this implementation, test code would be created by stringing together multiple templates.

Also, it was described that in running a test that a number of simultaneous users is "synchronized". Simultaneous users are simulated by synchronizing copies of the test code on different servers and on the same server. The term "synchronized" should not be interpreted in so limited a way as to imply that multiple copies are each performing exactly the same function at exactly the same time. Thus, when described herein that execution is synchronized, all that is required is that each copy of the code is making requests of the application under test during the window of time when the test is being executed. Some copies of the code will likely start execution sooner or end sooner than the others. However, as long as there is overlap in the timing of execution, the test programs can be said to be synchronized or running concurrently.

As a further variation, it was described that the test system 110 provides outputs indicating the performance of an application under test as a function of load. These outputs in graphical or tabular form can be used by an application developer to identify a number of concurrent users at which problems with the application are likely to be encountered. Potential problems are manifested in various ways, such as by a sudden change in response time or error rate as a function of load. Test system 110 could readily be programmed to automatically identify patterns in the output indicating these problem points.

Another useful modification would allow test system 110 to aid in identifying settings for various parameters in the deployment descriptor. As described above, the deployment descriptor for a bean identifies parameters such as memory usage and a "pooling number" indicating the number of instances of a bean that are created at the initialization of an application. These and other settings in the deployment descriptor might have an impact on the performance time and maximum load that an application could handle. One use of the test system described above is that it allows a test case to be repeated for different settings in the deployment descriptor. A human tester can analyze changes in performance for different settings in the deployment descriptor. However, test system 110 could be programmed to automatically edit the deployment descriptor of a bean by changing parameters affecting pooling or memory usage. Test system 110 could then automatically gather and present data showing the impact of a deployment descriptor on performance of an application.

Even higher levels of automation could be achieved by test system 110. For example, test system 110 might test the beans in an application and analyze the results of testing each bean. Test system 110 might identify the bean or beans that reflect performance bottlenecks (i.e. that exhibited unacceptable response times for the lowest numbers of simultaneous users). Then, test system 110 could run tests on those beans to find settings in the deployment descriptors that would balance the performance of the beans in the application (i.e. to adaptively adjust the settings in the deployment descriptors so that the bottleneck beans performed no worse than other beans.)

It should also be appreciated that computer technology is rapidly evolving and improved or enhanced versions of the hardware and software components making up the application under test and the test system are likely to become available. It should also be appreciated that the description of one device in a class is intended to be illustrative rather than limiting and that other devices within the same class might be substituted with ordinary skill in the art.

Also, it was described that the objects being tested are Enterprise Java Bean object oriented software components, which are written in the Java language. The same techniques are equally applicable to applications having components implemented in other languages. For example, applications written according to the COM standard might be written in Visual Basic and applications written for the CORBA standard might be written in C++.

Regardless of the specific language used, these standards are intended to allow separately developed components to operate together. Thus, each must provide a mechanism for other applications, such as test system 110, to determine how to access the methods and properties of their components. However, there could be differences in the specific commands used to access components.

In one embodiment, code generator 212 is implemented in a way that will make it easy to modify for generating test code for applications written in a different language. Specifically, code generator 212 stores intermediate results as a symbol table that is independent of the specific language used to program the application under test. The symbol table lists methods and properties for the component being tested. When to access these methods and what data to use for a particular test and what kinds of data to record can be determined from the information in the symbol table and input from the user. Thus, much of the functioning of code generator 212 is independent of the specific language used to implement the application under test.

In this way, the language specific aspects of code generator 212 are easily segregated and represent a relatively small part of the code generator 212. In particular, language specific information is needed to access the application under test to derive the information for the symbol table. Language specific information is also needed to format the generated client test code. But, it is intended that these parts of code generator 212 could be replaced to allow test system 110 to test applications written in other languages. Also, it is possible that test system 110 will contain multiple versions of the language specific parts and the user could specify as an input the language of the application under test.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of remotely testing a computerized application under test over a computer network, the method comprising the steps of:

providing test code that remains resident on a computer that exercises an object oriented component of the application under test;

executing a first instance of the test code across a network on the remote application under test;

recording performance data on the object oriented component of the remote application under test; and analyzing the recorded performance data to indicate a performance characteristic of the object oriented component of the remote application under test.

2. The method of claim 1 further comprising the step of executing at least one additional instance of the test code across the network on the remote application under test.

3. The method of claim 2 further comprising the step of synchronizing the execution of one instance of the test code with another instance of the test code.

4. The method of claim 3 wherein the step of synchronizing comprises starting each instance of the test code at a similar time.

5. The method of claim 1 wherein the step of providing test code includes generating test code automatically.

6. The method of claim 1 wherein the application under test is written in an object oriented language and the step of providing test code comprises providing test code to exercise one object in the application.

7. The method of claim 1 wherein the step of analyzing includes preparing a graphical display having as an independent variable the number of instances of the test code and the dependent variable is the performance data.

8. The method of claim 1 wherein the step of analyzing includes preparing a graphical display having as an independent variable the number of instances of the test code and the dependent variable is derived from the performance data.

9. The method of claim 1 wherein the application under test is resident on a first server on the network and the application has a remote interface and the test code is resident on at least a second computer on the network and exercises the application under test using the remote interface of the application under test.

10. The method of claim 1 wherein the step of analyzing includes displaying the analyzed data to a human user using a graphical user interface.

11. A method of remotely testing a computerized application under test, the method comprising the steps of:

a) specifying test conditions through a user interface to a test system;

b) initiating through the user interface to the test system the gathering of test data on the performance of a at least one object oriented component of the remote application under test, the test data as a result of test code that remains resident on a computer;

c) specifying through the user interface to the test system the output format of the test data; and d) displaying in the specified format the response of at least one object oriented component of the remote application under test.

12. The method of claim 11 wherein the specified format is a graphical format indicating response time as a function of load conditions.

13. The method of claim 11 wherein the specified graphical format is a Hi-Lo plot.

14. The method of claim 11 wherein the step of gathering of test data comprises initiating the execution of a plurality of copies of a test program, with the number of copies executing simultaneously relates to a load condition.

15. The method of claim 11 wherein the step of specifying an output format includes specifying a method by which response is measured.

16. The method of claim 11 wherein the step of gathering test data includes recording the execution time between selected points in the test program for each simultaneously executing copy of the test program and analyzing the recorded execution times for all copies of the test program.

17. The method of claim 16 wherein the step of analyzing comprises determining the average and maximum execution times for each of the load conditions.

18. The method of claim 16 wherein the events at which times are recorded includes times at which commands are issued to access functions of the object oriented components and times at which execution of the commands are completed.

19. The method of claim 11 wherein:

a) the computerized application under test comprises software resident on a server controlling access to a computerized database;

b) the server is connected to a network and the application under test is simultaneously accessed by a plurality of clients over the network; and c) the test system is resident on at least a second server connected to the network and is located remotely from said application under test.

20. The method of claim 11 wherein said application under test includes a plurality of object oriented components.

21. The method of claim 19 wherein each object oriented component has a plurality of functions therein and the test code exercises functions of the components.

22. A system for determining performance of a remotely located application under test in response to load, the system comprising:

a) coordination software;

b) at least one code generator, receiving as an input commands from the coordination software and having as an output client test code;

c) at least one test engine, receiving as an input commands from the coordination software, the test engine comprising a computer server having a plurality of threads thereon, each thread executing an instance of the client test code; and d) at lease one data log having computerized memory, the memory holding timing data created by the instances of the client test code in the plurality of threads.

* * * * *